Jan. 30, 1951  H. A. GAMBLE  2,540,046
COTTON PICKER

Filed Nov. 20, 1947  4 Sheets-Sheet 1

Inventor
Hugh A. Gamble
By
Attorney.

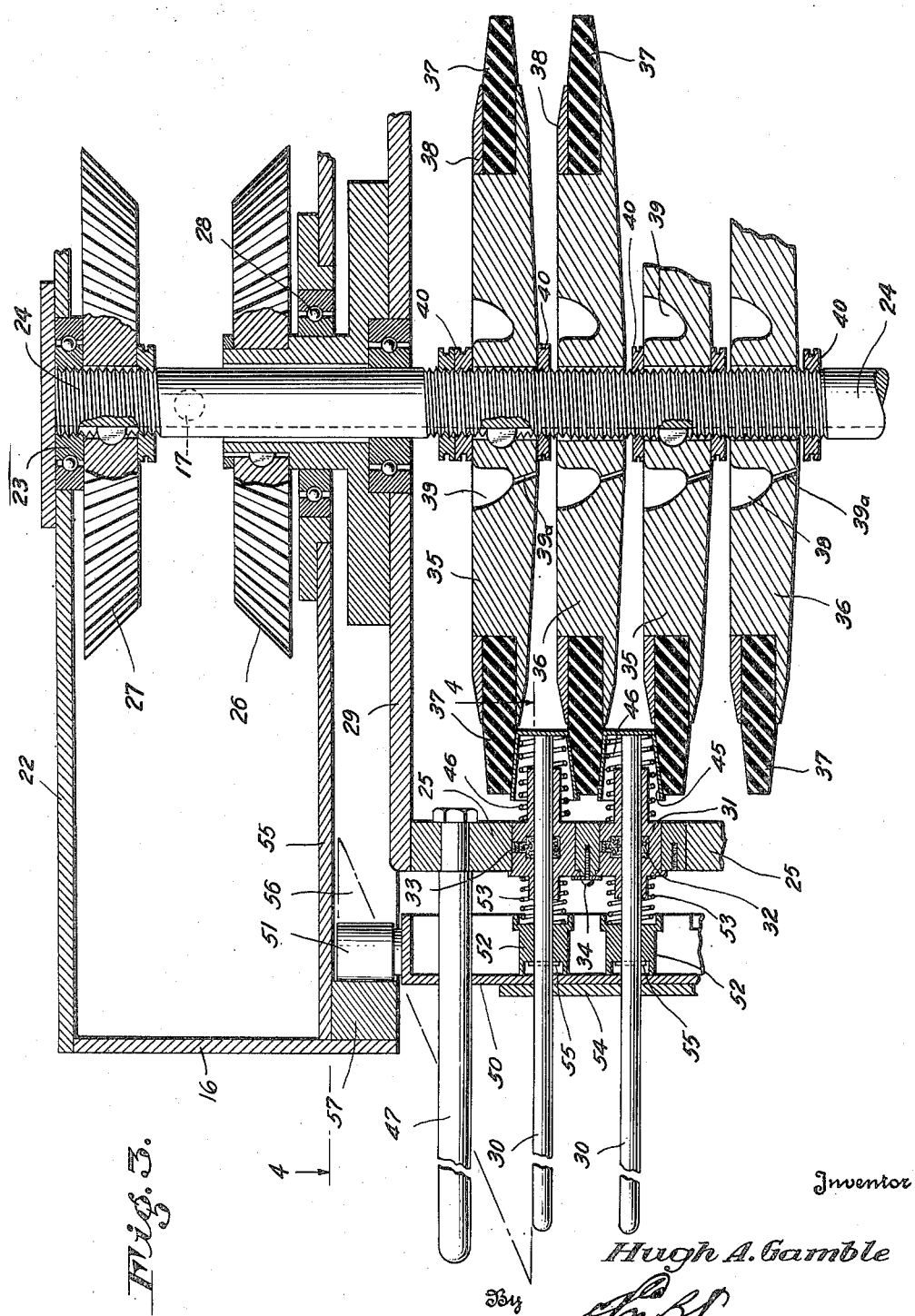

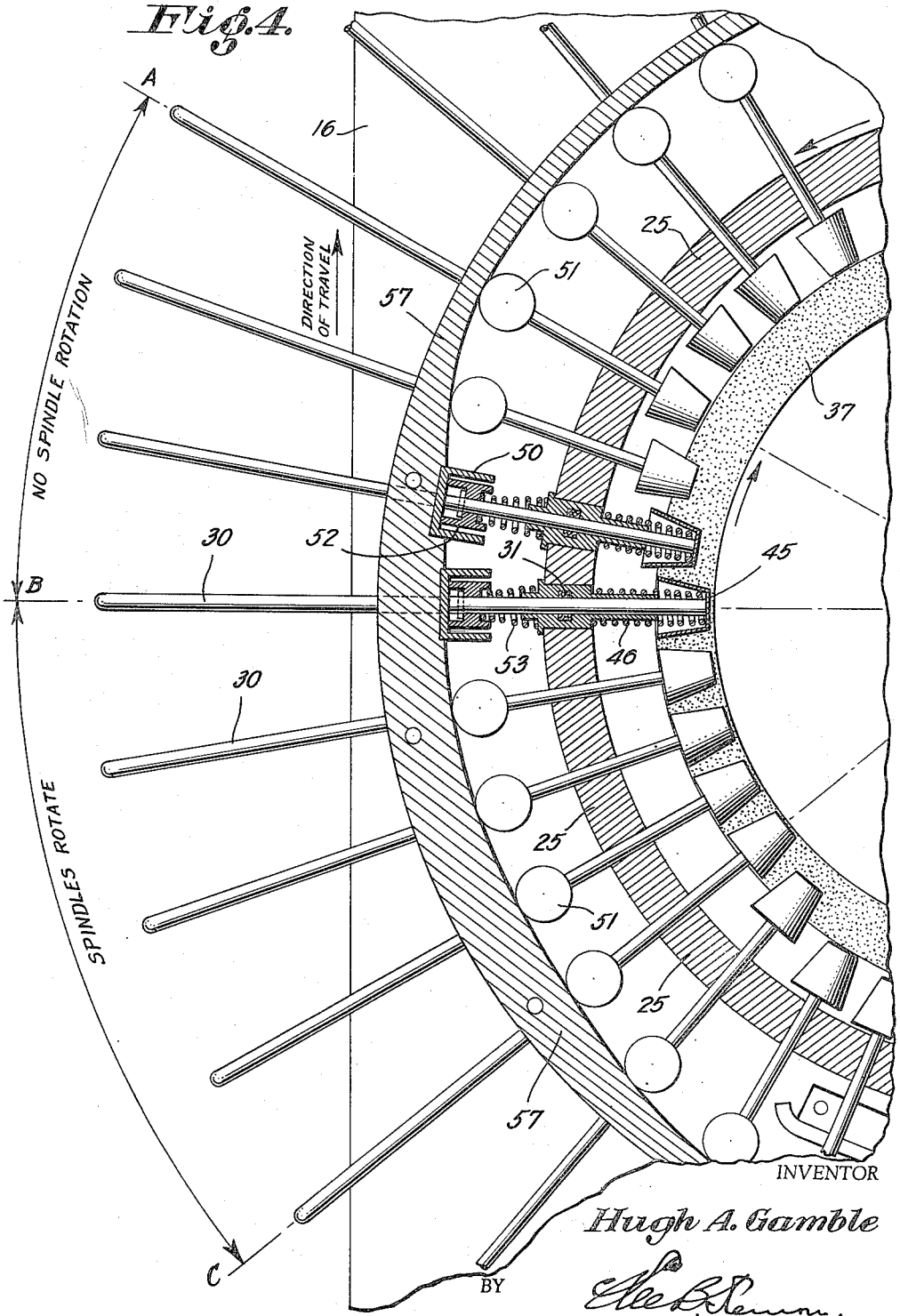

Patented Jan. 30, 1951

2,540,046

UNITED STATES PATENT OFFICE 2,540,046

COTTON PICKER

Hugh A. Gamble, Greenville, Miss., assignor of one-half to William Burris Smith, Greenville, Miss.

Application November 20, 1947, Serial No. 787,052

4 Claims. (Cl. 56—46)

This invention relates to cotton harvesters and more particularly to a rotary spindle type cotton picker and the construction of the spindle driving and shifting mechanisms.

The spindle type cotton picker as shown, for example, in Patent 1,747,566, issued to Hiram N. Berry, February 18, 1930, comprises a plurality of rotary picking spindles supported by and projecting from a rotary drum or cylinder. The drum is rotated on a vertical axis and moved along the side of a row of cotton plants while the rotary picking spindles are successively projected into the plant to wind off the cotton. The picked cotton on the spindles is removed therefrom by stripper bars after the spindles pass out of the plant.

It is found that if the picking spindles are rotating while they are penetrating into the cotton plant, the cotton is wound unevenly along the length of the spindle, and may form a ball on the outer end of the spindle. The uneven winding of the cotton on the rotating spindles prevents the spindles from effectively picking some of the cotton from the plant, and such cotton pickers may gather only two-thirds of the cotton on each plant during the pass of the picker along the row of plants. It is found that where the spindle rotating mechanism is arranged to permit the spindle to penetrate into a cotton plant before spindle rotation is initiated, the cotton is then wound onto the spindles more evenly and about ninety-five percent or more of the cotton in the plants may be harvested by one pass of the mechanical picker along the row.

It is an object of this invention to provide an improved driving mechanism for cotton picking spindles which does not initiate rotation of the spindles until they have fully penetrated the cotton plant.

It is another object of this invention to provide a novel cam mechanism for controlling the starting and stopping of the spindle rotating cycle.

It is another object of this invention to provide an improved spindle driving arrangement in which the picking spindles are rotated only during the cycle in which the spindle is being withdrawn from a cotton plant.

It is another object of this invention to provide an improved bearing and driving assembly for the rotary spindles of drum type cotton pickers.

It is a still further object of this invention to provide an improved friction drive mechanism for rotating cotton picking spindles.

It is still another object of this invention to provide for controlling the spindle drive by guiding of the movement of stripper bars in a particular path.

It is still another object of this invention to provide rotary spindle driving and controlling mechanisms which are relatively simple in construction and economical to manufacture.

Other objects and advantages of this invention will be readily apparent to those skilled in the art from examination of the following description of the preferred construction illustrated in the accompanying drawings wherein:

Figure 3 is a vertical sectional view, partly cut away, taken on line 3—3 of Figure 2, of the upper portion of the picking unit.

Figure 4 is an enlarged horizontal view, partly in section and partly diagrammatic of a portion of the view shown in Figure 2, with only two of the several spindle mounting assemblies shown in section.

Figure 1:
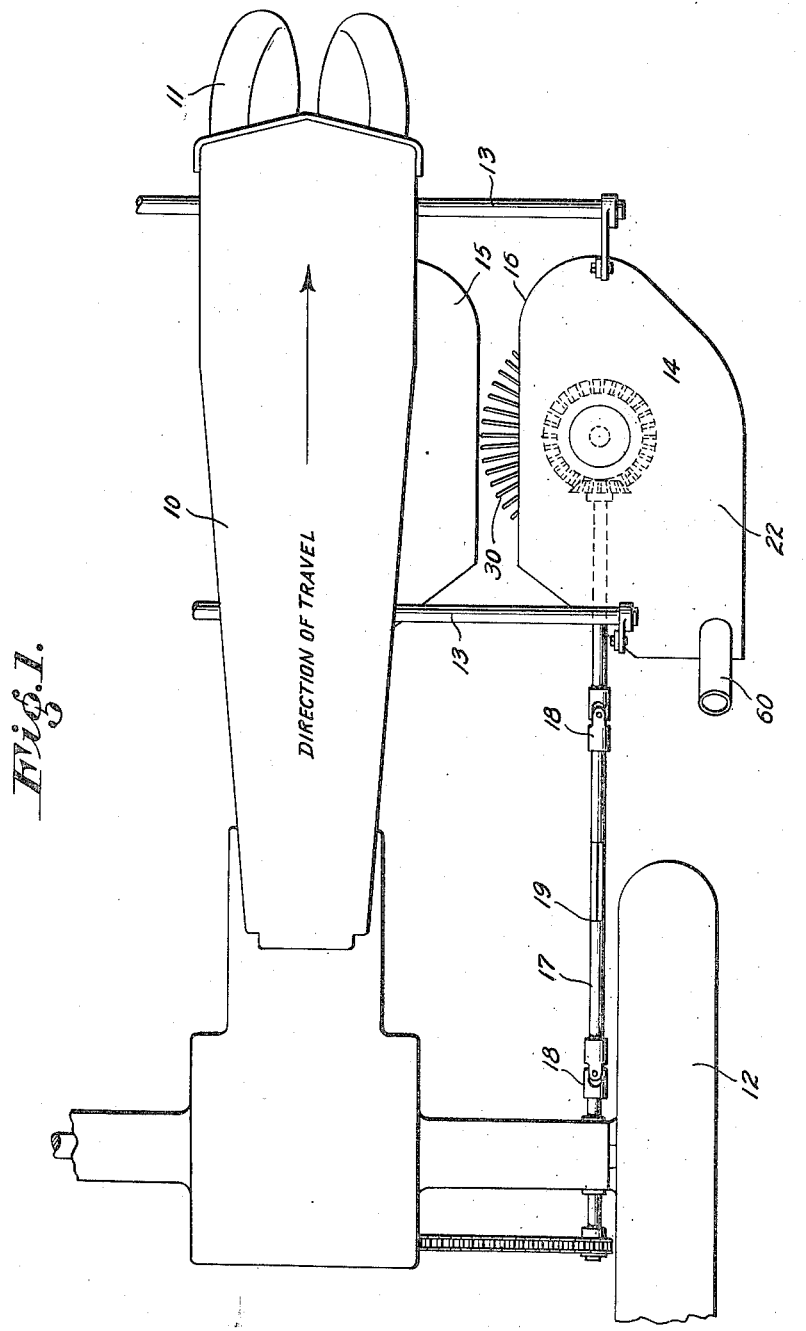
Figure 1 is a plan view, partly cut away, showing in outline a cotton picker embodying my invention and mounted on one side of a conventional tractor.

Referring to Figure 1, the tractor 10, which may be of any type suitable for having its front wheels 11 pass along between rows of cotton plants and for having its rear wheels 12, only one being shown, straddle a row or rows of plants, is provided with suitable horizontally extending supports 13 from which the picker unit 14 may be adjustably suspended. The tractor 10 may be provided with a plant compressor member or guide 15 which cooperates with the side 16 of the picker unit 14 to compress and guide the cotton plants along the side 16 of the picker unit 14, as the tractor 10 travels along the row. A picker unit 14 may be supported on each side of the tractor 10, so that the harvester may operate on two rows of cotton plants simultaneously. The picker unit 14 may be driven through a power take-off mechanism in the rear housing of the tractor 10 connected to the adjustable picker unit 14 by a drive shaft 17 having universal joints 18 and a slidable connection 19.

The picker unit 14 includes a casing or frame having a bottom plate 21 and a top plate 22 connected by side plates, the side plate 16 adjacent to the tractor 10 having openings therein to permit the picking spindles 30 to be moved into and out of the cotton plants as hereinafter described.

A vertical shaft 24 is located within the picker unit casing and may be provided with a suitable bearing 23 in the top plate 22 and with a lower bearing in the bottom plate 21. Suitable gearing 27 is provided between the drive shaft 17 and the vertical shaft 24 so that the latter may be rotated in a clockwise direction when looking downward on Figure 2. A vertical drum or cylinder 25 is mounted in the picker unit casing coaxial with the shaft 24 by means of bearing 28 and spider 29 and a similar bearing and spider at the lower end of shaft 24. The drum 25 is driven by a gear 26 cooperating with gearing on the drive shaft 17 for rotating the drum 25 in a counterclockwise direction when the central shaft 24 is rotated in a clockwise direction.

A plurality of rotary picking spindles 30 are supported by the drum 25 in bearing members 31 removably secured in openings in the periphery of the drum 25. The complete assembly may comprise thirty-six vertical rows of eighteen spindles each, making a total of six hundred and forty-eight spindles per unit. The spindles in each vertical row are spaced apart a distance somewhat less than the normal diameter of a boll of cotton, so that when the spindles enter a cotton plant each boll of cotton will be engaged by at least one of the spindles, as is well known to those skilled in the art.

Each spindle 30 is supported by a tubular bearing member 31 and is arranged to be rotated therein and also to be shifted axially thereof. The bearing members 31 may be of case hardened steel and may be provided with an annular recess containing a felt wick 32 for distributing a lubricant between the spindle and the bearing. The bearing member may be provided with an opening closed by a removable plug 33 for the purpose of permitting additional lubricant to be applied to the wick 32. The bearing members may be secured in position in apertures in the drum 25 by means of removable clamps 34 or other suitable means.

The driven shaft 24 is provided within the drum 25 with a series of metal disc members 35 and 36, each disc having a ring of resilient material 37 secured to the periphery thereof by an annular member 38 clamping the material to the disc members 35 and 36. The material 37 is preferably a durable plastic material such as chloroprene rubber. The alternate disc members 35 are keyed to the shaft 24 to be driven thereby, and the intermediate disc members 36 are free on the shaft 24 for rotation in a direction opposite to the rotation of the shaft. Each disc 35 and 36 may be provided with a central annular recess 39 adjacent the shaft 24, each recess having an outlet 39, so that lubricating oil is distributed downward near the shaft 24 and not permitted to move radially outward on the discs. The friction driving material 37 is thus maintained free of lubricant. Portions of the shaft 24 may be threaded and provided with clamping rings 40 to permit precise adjustment of the position of each of the driven discs 35 on the shaft 24.

Each picker spindle 30 is provided with a driving cone or cup element 45 secured to the inner end thereof as by welding. The angle of an element of the cone 45 with respect to the axis of the spindle 30 is preferably of the order of five degrees or less. A coil spring 46 is positioned between the bearing member 31 and the driving cup 45 tending to urge the latter into driving engagement with the driving rings 37 of the discs 35. Guide fingers 47 may be carried by the drum 25, there being a guide finger 47 at the top and at the bottom of each vertical row of picking spindles 30, said guide fingers being non-rotatable on their own axis but being rotatable with the drum 25 about the shaft 24.

The drum and spindle assembly is surrounded by a series of vertically arranged stripper bars 50, there being a stripper bar 50 for each vertical row of picking spindles 30. Each stripper bar 50 is provided with a series of openings therethrough, one at the top and one at the bottom through which the guide fingers 47 may extend, and intermediate openings through which the picking spindles 30 extend. The upper and lower end of each stripper bar 50 is provided with a roller 51 which engages a cam track described hereinafter for guiding the path of movement of the stripper bars around the drum 25. The spindles 30 are provided with flanged collar elements 52 spaced from the bearing members 31 by relatively heavy coil springs 53 surrounding the spindles 30. The stripper bar 50 may be of U-shaped cross-section and is provided on its outer face with a doffing element or elements 54 to strip cotton from the spindle 30 when the bar 50 travels toward the outer ends of a vertical row of spindles. A pin 55 may be provided through the spindle 30 adjacent the collar element 52 to limit the movement of the collar 52 along the spindle when the stripper bar travels toward the outer ends of spindles.

Figure 2:
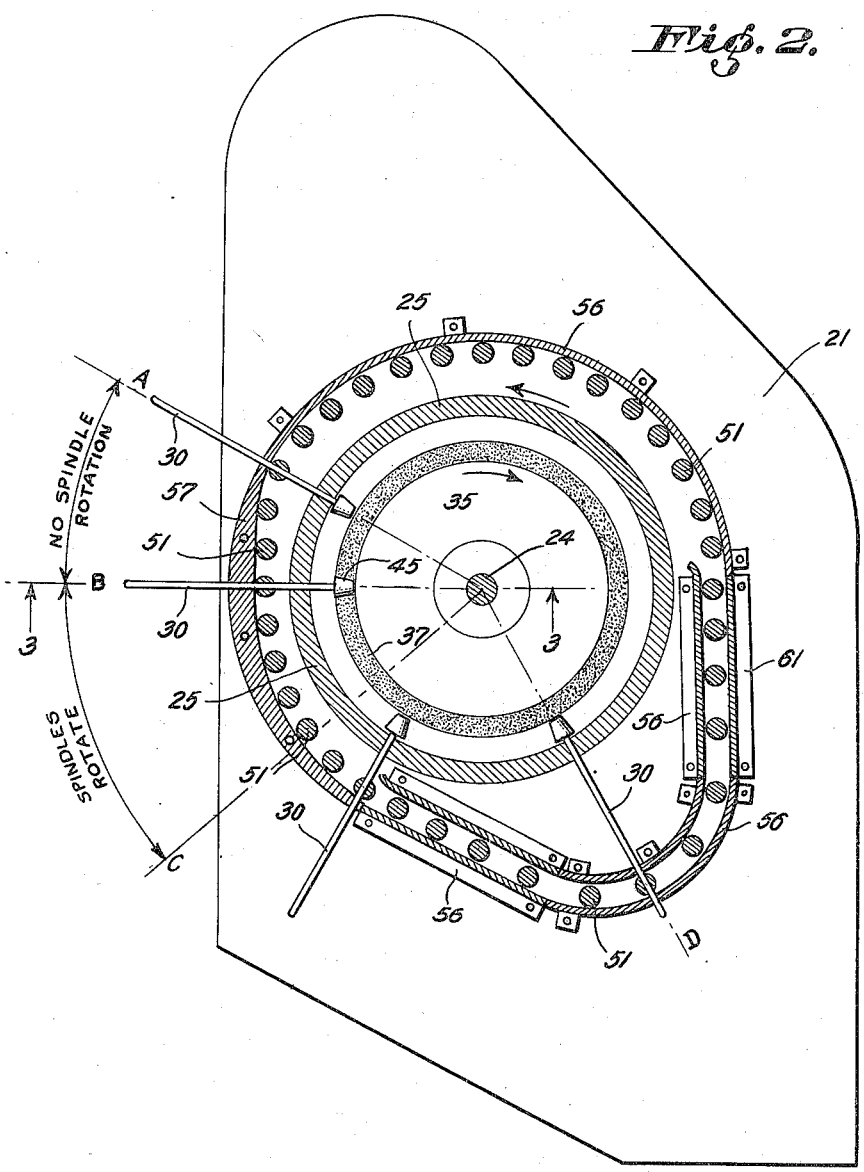
Figure 2 is a horizontal view partly in section of the lower inner portion of the cotton picker unit shown in Figure 1, with only a few of the picking spindles diagrammatically indicated thereon.

The cam track for guiding the movement of the stripper bars 50 is shown in plan view in Figure 2, and may be formed from angle members 56 bolted to the bottom plate 21 and similar members bolted to the cross plate 55 within the upper portion of the picker casing. The outer angle member of the cam track engages the rollers 51 on the ends of the stripper bars 50 and determines the distance of the stripper bar from the axis of shaft 24 at all times. Beginning at point A, the outer member 57 of the cam track in a counterclockwise direction extends gradually inward closer to the shaft 24. Between points A and B the inward slope or shortening radius of the cam 57 is sufficient to move a stripper bar 50 guided by said cams inward toward the shaft 24 enough to compress the heavy springs 53 and to thereby permit the springs 46 to move the spindle driving cones 45 into frictional engagement with rings 37 of the driven discs 35. The cam 57 is positioned and formed so that driving contact of the cones 45 with the rings 37 does not occur until the vertical row of spindles 30 reaches position B in a vertical plane through the axis of shaft 24 and perpendicular to the direction of travel of the picking unit along a row of plants, at which position said row of spindles have fully penetrated the cotton plants compressed between the guide members 15 and 16. Rotation of the picking spindles 30, therefore, is initiated and begins at point B at which point the cams 57 are closest to the axis of shaft 24, and continues until the spindles have reached approximately point C and have left the cotton plants. At point C, the cam track 57 is outward enough from the axis of the shaft 24 so that the rollers 51 and the stripper bars 50 are far enough from the drum 25 to permit the heavy springs 53 to counteract the lighter springs 46 and to move the driving cones 45 out of contact with the driving rings 37. Actual rotation of the picking spindles 30, therefore, begins at point B and ends at about point C, the horizontal angle during which the spindles are frictionally driven being preferably of the order of about forty degrees. The idler discs 36 provided between the driving discs 35 serve to equalize the vertical thrust on the driving cones 45 and hence prevent uneven wear of the bearing members 31. The idler discs 36 being freely mounted on the shaft 24 are free to rotate in a direction opposite to the direction in which the discs 35 are driven by gear 27.

From point C, the cam track 56 moves outwardly away from the shaft 24 so that by the time the stripper bars 50 reach the point D, the doffing elements 54 on the bars are nearly at the outer ends of the non-rotating spindles 30 and have removed the cotton therefrom. Suitable cotton collecting mechanism, not shown, may be located in the vicinity of point D within the picker unit casing to deliver the loose cotton from the picking unit through the conduit 60, Figure 1, to suitable storage bags or receptacles carried elsewhere on the tractor 10.

The shape of the cam track 57 which causes the spindles 30 to be rotated only through angle B to C results in the use of less driving power than in the case of cotton pickers in which the spindles are rotated throughout their paths of travel. Since the cam 57 does not initiate spindle rotation until the spindles have fully penetrated the cotton plants, even and efficient collection or winding off of the cotton from the plants to the spindles is effected.

In the operation of the cotton picker described herein, the tractor 10 is driven along a row of cotton plants so that the plants enter and pass rearward through the guides 15 and 16. The picking unit 14 is driven so that the rearward movement of the projecting spindles 30 shown in Figure 1 is at the same speed at which the tractor moves forward. The spindles 30 are, therefore, projected into the cotton plants and have no appreciable lateral movement with respect to the plants. When a vertical row of picking spindles has fully penetrated a cotton plant and reached position B, Figure 2, in which the spindles are perpendicular to the direction of movement of the tractor along the row of plants, the rotation of said vertical row of picking spindles is then initiated by means of the cam track 57 having moved the stripper bar 50, through which said needles extend, toward the drum 25. Such movement of a stripper bar 50 causes it to engage collar elements 52, compress springs 53 and permit springs 46 to urge the driving cones 45 into frictional engagement with the ring 37 of driving disc 35 and also into contact with the ring 37 of idler disc 36, as illustrated in Figure 3. The spindle driving relationship is maintained by the cam track 57 until the vertical row of spindles has about reached the point C where the rotating spindles have been fully withdrawn from the cotton plant. The picking spindles do not rotate as they pass from point C to point D, and the cam track moves the stripper bars outward toward the outer ends of the spindles easily doffing the picked cotton from the non-rotating spindles. As a vertical row of spindles passes onward from point D around through point A to point B, the cam track 56 is such as to cause the spindles to be non-rotating and hence less power consumption and longer spindle bearing life is assured.

The spindles 30 may be of any conventional form and may be slightly tapered toward their outer ends and may be provided with longitudinal grooves or with slight projections thereon to aid in the winding of cotton fibers thereon, as is well known in the art. The cam track 56 on the upper plate 55, Figure 3, is similar to the cam track 56 on the bottom plate 21, Figure 2, so that the stripper bars 50 travel around the drum 25 with each stripper bar always parallel to the axis of the drum. Portions of the cam track 56 may be made removable to facilitate the removal of one or more stripper bars from the guide fingers 47 and from the vertical row of spindles 30. By removing a stripper bar 50, access is provided for the removal of the clamps 34 holding the spindle bearing elements 31 to the drum 25. After the clamps 34 holding a bearing element are removed, the bearing element 31 together with the spindle 30, the driving cone 45, the retaining collar 52, and the springs 46 and 53, may be removed outwardly as a unit for repair or replacement. When the spindle and bearing assembly is thus removed from the drum 25, access is provided through the opening in the drum for the insertion of tools effective to make adjustment of the clamping rings 40 in order to adjust the position of the driving discs 35 along the shaft 24.

This invention contemplates the use of various other forms of bearings, driving gear, cams, casings, and the like, than those specifically illustrated and described herein, as it will be readily apparent to the skilled mechanic that such variations are possible within the scope of the following claims.

What I claim is:

1. In a cotton picker movable along the side of a row of cotton plants, the combination comprising, a frame, a drum supported by said frame for rotation on a vertical axis, a series of rotatable picking spindles carried by and projecting outward through said drum, a spindle driving member mounted within said drum, a spindle driving element secured to the inner end of each spindle and engageable with said driving member, said rotatable spindles being axially movable in said drum to engage said spindle driving elements with said spindle driving member, a cam carried by said frame and extending around a portion of the periphery of said drum, said cam being closest to the vertical axis of said drum in a vertical plane through the axis of said drum and perpendicular to the direction of movement of said picker along said row of plants, and means extending between said cam and said spindles for moving said spindles axially to engage said spindle driving element with said spindle driving member in said vertical plane to initiate rotation of said picking spindles after said spindles have penetrated into cotton plants in said row.

2. In a cotton picker movable along the side of a row of cotton plants, the combination comprising, a frame, a drum supported by said frame for rotation on a vertical axis, a series of rotatable picking spindles carried by and projecting outward through said drum, a spindle driving member mounted within said drum, a spindle driving element secured to the inner end of each spindle and engageable with said driving member, said rotatable spindles being axially movable in said drum to engage said spindle driving elements with said spindle driving member, resilient means associated with said spindles to urge said spindles axially outward of said drum, a cam carried by said frame and extending around a portion of said drum, said cam being closest to the vertical axis of said drum in a vertical plane through the axis of said drum and perpendicular to the direction of movement of said picker along said row of plants, and means extending between said cam and said resilient means for moving said spindles axially to engage said spindle driving element with said spindle driving member in said vertical plane to initiate rotation of said picking spindles after said spindles have penetrated into cotton plants in said row.

3. In a cotton picker movable along the side of a row of cotton plants, the combination comprising, a frame, a drum supported by said frame for rotation on a vertical axis, a series of rotatable picking spindles carried by and projecting outward through said drum for penetration into and withdrawal from said cotton plants, a spindle driving member mounted within said drum, a spindle driving element secured to the inner end of each spindle and engageable with said driving member, said rotatable spindles being axially movable into said drum to engage said spindle driving elements with said spindle driving member, a cam carried by said frame and extending around a portion of the periphery of said drum, said cam being closest to the vertical axis of said drum in an area beginning in a vertical plane through the axis of said drum and perpendicular to the direction of forward movement of said picker along said row of plants, said area extending rearward from said vertical plane, and means extending between said cam and said spindles for moving said spindles axially to engage said spindle driving element with said spindle driving member in said vertical plane to initiate rotation of said picking spindles after said spindles have penetrated into said cotton plants and to continue rotation of said spindles during withdrawal of said spindles from said plants.

4. In a cotton picker movable along a row of cotton plants, the combination comprising, a frame, a rotatable drum carried by said frame, a series of rotatable picking spindles carried by and projecting outward through said rotatable drum for penetration into and withdrawal from said plants, rotatable means associated with the inner ends of said spindles for rotating said spindles, a driving member engageable with said means, and actuating means carried by said frame and spaced from the axis of said drum, said actuating means being closest to said drum axis in an area beginning in a plane through said drum axis and perpendicular to the direction of forward movement of said picker along said row of plants and extending rearward from said plane, said actuating means engaging said driving member in said area for initiating rotation of said picking spindles after said spindles have penetrated into said cotton plants and continuing the rotation of said picking spindles during withdrawal of said spindles from said plants.

HUGH A. GAMBLE.

REFERENCES CITED

The following references are of record in the file of this patent:

UNITED STATES PATENTS

| Number | Name | Date |
|--------|------|------|
| 555,118 | Pickering | Feb. 25, 1896 |
| 1,747,566 | Berry | Feb. 18, 1930 |